(12) United States Patent
Sweeney et al.

(10) Patent No.: US 9,191,643 B2
(45) Date of Patent: Nov. 17, 2015

(54) MIXING INFRARED AND COLOR COMPONENT DATA POINT CLOUDS

(71) Applicant: Microsoft Corporation, Redmond, WA (US)

(72) Inventors: Patrick John Sweeney, Woodinville, WA (US); David F. Harnett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 13/913,454

(22) Filed: Jun. 9, 2013

(65) Prior Publication Data

US 2014/0307952 A1    Oct. 16, 2014

Related U.S. Application Data

(60) Provisional application No. 61/812,233, filed on Apr. 15, 2013.

(51) Int. Cl.
*G06K 9/00* (2006.01)
*H04N 13/00* (2006.01)
(Continued)

(52) U.S. Cl.
CPC ............ *H04N 13/0007* (2013.01); *G01B 11/22* (2013.01); *G06K 9/03* (2013.01); *G06K 9/38* (2013.01); *G06K 9/6293* (2013.01); *G06T 7/0055* (2013.01); *G06T 7/0057* (2013.01); *G06T 7/0075* (2013.01); *G06T 7/0077* (2013.01); *G06T 7/0079* (2013.01); *G06T 7/0081* (2013.01); *G06T 7/0097* (2013.01); *H04N 9/75* (2013.01); *H04N 13/0271* (2013.01); *G06T 2207/10016* (2013.01); *G06T 2207/10024* (2013.01); *G06T 2207/10028* (2013.01); *G06T 2207/10048* (2013.01); *G06T 2207/20021* (2013.01); *G06T 2207/20144* (2013.01); *G06T 2207/20148* (2013.01)

(58) Field of Classification Search
USPC .......................................... 382/154, 167, 284
See application file for complete search history.

(56) References Cited

U.S. PATENT DOCUMENTS 5,812,787 A     9/1998 Astle
7,606,417 B2   10/2009 Steinberg et al.
(Continued)

FOREIGN PATENT DOCUMENTS

CN      103279987 A    9/2013
WO      2012041419 A1  4/2012
WO      2013056188 A1  4/2013

OTHER PUBLICATIONS

"International Search Report & Written Opinion for PCT Patent Application No. PCT/US2014/033918", Mailed Date: Sep. 4, 2014, Filed Date: Apr. 14, 2014, 11 Pages.
(Continued)

*Primary Examiner* — Duy M Dang
(74) *Attorney, Agent, or Firm* — Sandy Swain; Micky Minhas (57) ABSTRACT

The subject disclosure is directed towards mixing RGB data with infrared data so as to provide depth-related data in regions where infrared data are sparse. Infrared data, such as corresponding to point cloud data, are processed to determine sparse regions therein. For any such sparse regions, RGB data corresponding to a counterpart region in the RGB data are added to a data structure. The data structure, which may include or be concatenated to the IR data, may be used for depth-related data, e.g., with a point cloud.

20 Claims, 8 Drawing Sheets

(51) Int. Cl.
G06T 7/00 (2006.01)
G01B 11/22 (2006.01)
G06K 9/03 (2006.01)
G06K 9/38 (2006.01)
G06K 9/62 (2006.01)
H04N 9/75 (2006.01)
H04N 13/02 (2006.01)

(56) References Cited

U.S. PATENT DOCUMENTS

| | | |
|---|---|---|
| 8,249,349 B2 | 8/2012 | Blake et al. |
| 8,290,264 B2 | 10/2012 | Kim et al. |
| 8,330,831 B2 | 12/2012 | Steinberg et al. |
| 8,345,982 B2 | 1/2013 | Gokturk et al. |
| 8,355,565 B1 | 1/2013 | Yang et al. |
| 8,625,897 B2 | 1/2014 | Criminisi et al. |
| 2006/0269145 A1 | 11/2006 | Roberts |
| 2011/0096832 A1 | 4/2011 | Zhang et al. |
| 2011/0293179 A1* | 12/2011 | Dikmen et al. ............... 382/167 |
| 2011/0317005 A1 | 12/2011 | Atkinson |
| 2012/0194650 A1 | 8/2012 | Izadi et al. |
| 2012/0287247 A1 | 11/2012 | Stenger et al. |
| 2013/0095920 A1 | 4/2013 | Patiejunas et al. |
| 2013/0100256 A1 | 4/2013 | Kirk et al. |
| 2013/0147785 A1 | 6/2013 | Patiejunas et al. |
| 2013/0151210 A1 | 6/2013 | Kallay et al. |
| 2013/0156297 A1 | 6/2013 | Shotton et al. |
| 2013/0177296 A1 | 7/2013 | Geisner et al. |
| 2013/0321396 A1 | 12/2013 | Kirk et al. |
| 2013/0321564 A1 | 12/2013 | Smith et al. |
| 2013/0321575 A1 | 12/2013 | Kirk et al. |
| 2013/0321586 A1 | 12/2013 | Kirk et al. |
| 2013/0321589 A1 | 12/2013 | Kirk et al. |
| 2013/0321590 A1 | 12/2013 | Kirk |
| 2013/0321593 A1 | 12/2013 | Kirk et al. |

OTHER PUBLICATIONS

Chiu, et al., "Improving the Kinect by Cross-Modal Stereo", In Proceedings of the British Machine Vision Conference 2011, Oct. 11, 2011, 10 Pages.

Gill T, et al., "A system for change detection and human recognition in voxel space using the Microsoft Kinect sensor", In Proceedings of the Applied Imagery Pattern Recognition Workshop (AIPR), 2011 IEEE, Oct. 11, 2011, 9 pages.

Harville M, et al., "Foreground Segmentation Using Adaptive Mixture Models in Color and Depth", In Proceedings of IEEE Workshop on Detection and Recognition of Eventsin Video, Jul. 8, 2001, pp. 3-11.

Yaman, et al., "Multimodal Stereo Vision Using Mutual Information with Adaptive Windowing", Retrieved on: Apr. 23, 2013, Available at: http://kovan.ceng.metu.edu.tr/~sinan/publications/MVA13_Yaman.pdf.

Benko, et al., "DepthTouch", In IEEE Tabletops and Interactive Surfaces, Oct. 1, 2008, 1 pages.

Mutto, et al., "Accuracy and Resolution of Kinect Depth Data for Indoor Mapping Applications", In Academic Journal of Sensors, vol. 12, Issue 2, Feb. 1, 2012, 8 pages.

Mutto, et al., "A Probabilistic Approach to ToF and Stereo Data Fusion", In Proceeding of 3DPVT Conference, May, 2010, 8 pages.

Yu-Peng, et al., "Automatic Foreground-background Segmentation Based on Depth from Coded Aperture", In IEEE Symposium on Photonics and Optoelectronics, May 21, 2012, 4 pages.

Piccardi, Massimo, "Background Subtraction Techniques: A Review", In the ARC Centre of Excellence for Autonomous Systems, Faculty of Engineering, UTS, Apr. 15, 2004, 30 pages.

Kowdle, et al., "Multiple View Object Cosegmentation using Appearance and Stereo Cues", In Proceedings of the 12th European Conference on Computer Vision—vol. Part V, Oct. 7, 2012, 14 pages.

Lee, et al., "3-D Video Generation using Hybrid Camera System", In Proceedings of International Conference on Immersive Telecommunications, Jun. 2009, 6 pages.

Ahmed, Naveed, "A System for 360 Acquisition and 3D Animation Reconstruction using Multiple RGB-D Cameras", Published on: Oct. 18, 2013, Available at: http://www.mpi-inf.mpg.de/~nahmed/casa2012.pdf.

Ahmed, Naveed, "Spatio-Temporally Coherent 3D Animation Reconstruction from Multi-view RGB-D Images using Landmark Sampling", In Proceedings of the International MultiConference of Engineers and Computer Scientists, vol. 1, Mar. 13, 2013, 5 pages.

Lee, et al., "Generation of Multi-View Video Using a Fusion Camera System for 3D Displays", In IEEE Transactions on Consumer Electronics, vol. 56, Issue 4, Nov. 2010, 9 pages.

Kang, et al., "Geometrical Compensation for Multi-view Video in Multiple Camera Array", In Proceeding of 50th International Symposium ELMAR, vol. 1, Sep. 10, 2008, 3 pages.

U.S. Appl. No. 13/599,170, Kirk, et al., "Multi-Input Free Viewpoint Video Processing Pipeline", Filed Date: Aug. 30, 2012, 55 pages.

U.S. Appl. No. 13/588,917, Kirk, et al., "Cloud Based Free Viewpoint Video Streaming", Filed Date: Aug. 17, 2012, 66 pages.

U.S. Appl. No. 13/598,747, Kirk, et al., "High Definition Bubbles for Rendering Free Viewpoint Video", Filed Date: Aug. 30, 2012, 37 pages.

U.S. Appl. No. 13/599,263, Sweeney, et al., "Video Generation Using Three-Dimensional Hulls", Filed Date: Aug. 30, 2012, 38 pages.

U.S. Appl. No. 13/599,436, Kirk, Adam G., "Glancing Angle Exclusion", Filed Date: Aug. 30, 2012, 29 pages.

U.S. Appl. No. 13/918,747, Romea, et al., "Multimodal Foreground Background Segmentation", Filed Date: Jun. 14, 2013, 46 pages.

"International Preliminary Report on Patentability Issued in PCT Patent Application No. PCT/US2014/033918", Mailed Date: Aug. 17, 2015, 6 Pages.

* cited by examiner

MIXING INFRARED AND COLOR COMPONENT DATA POINT CLOUDS

CROSS-REFERENCE TO RELATED APPLICATION

The present application claims priority to U.S. provisional patent application Ser. No. 61/812,233, filed Apr. 15, 2013.

BACKGROUND

In active depth sensing, a projector projects patterns of light such as infrared (IR) dots to illuminate a region being sensed. The projected patterns are captured by a camera/sensor (two or more in stereo systems), with the image (or images) processed to compute a depth map or the like, e.g., per frame. Infrared is advantageous because color (RGB) images results in very noisy depth values.

In stereo systems, stereo cameras capture two images from different viewpoints. Then, for example, one way to perform depth estimation with a stereo pair of images is to find correspondences between the images, e.g., to correlate each projected and sensed IR dot in one image with a counterpart IR dot in the other image. Once matched, the projected patterns within the images may be correlated with one another, and disparities between one or more features of the correlated dots used to estimate a depth to that particular dot pair. For example, a dense depth map at the original (native) camera resolution may be obtained by area matching (e.g., via a window of size 5×5).

However, not all surfaces reflect IR light particularly well. As a result, in any part of an image that corresponds to a poorly reflective IR surface, there are generally not enough IR data (e.g., reflected dots) in the stereo images to correlate with one another, and thus no depth data or very sparse depth data. This is problematic even with a single two-dimensional depth map; in point cloud applications, such as those that use depth data to construct a mesh, the lack of adequate depth data in certain regions may be even more pronounced.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards using color component (e.g., RGB) data to augment infrared data in regions where the infrared data is sparse. One or more aspects are directed towards obtaining infrared data having infrared data points and color component data having color component data points corresponding to an image plane. Upon determining a region in the infrared image data that is a sparse region with respect to having infrared data points therein, at least some color component data corresponding to color component data points from a counterpart region in the color component image data are added to a data structure.

In one or more aspects, an image processing component is configured to receive infrared images captured by at least one infrared (IR) camera, and counterpart red, green, blue (RGB) images captured by at least one RGB camera. A mixing component coupled to or incorporated into the image processing component processes infrared data corresponding to an infrared image to determine one or more sparse regions therein. For each sparse region, the mixing component adds RGB data corresponding to a counterpart region in a counterpart RGB image to a data structure.

One or more aspects are directed towards obtaining first IR data corresponding to point cloud data projected onto a first image plane and obtaining first RGB data corresponding to point cloud data projected onto the first image plane. One or more sparse infrared regions in the first infrared data and one or more counterpart regions of the sparse infrared regions in the first RGB data are determined. At least some RGB data from the one or more counterpart regions are added to a data structure. This may be performed with a second set of IR data and RGB data, and so on, to add RGB data to the data structure in regions where the IR data is sparse.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using RGB data for depth data estimation in regions where infrared data is sparse. In one aspect, the density of infrared data (e.g., points projected from an infrared point cloud) is evaluated at various subparts so as to augment any low-density subpart (based upon IR) with RGB data. In this way, the mixing of the RGB and IR stereo points based on density provides for a point cloud with more complete depth data.

In one aspect, the density is computed over multiple subparts of a two-dimensional image plane corresponding to a projection from the infrared point cloud onto that image plane. The subparts may be arranged as a grid or the like. For any grid cell, the IR point density is evaluated, and if too low, the RGB point data for that grid cell is maintained, otherwise the RGB point data is discarded. The process may be repeated for as many sets of cameras (pods) that were used in capturing the point cloud data in a given configuration.

It should be understood that any of the examples herein are non-limiting. For example, while a three-dimensional point cloud captured by multiple arranged pods is exemplified herein, the technology described herein may be applies to as little as one single two-dimensional depth map. Further, while RGB (red, green blue) color component data is described, the RGB sensor may be replaced with or augmented with an ultraviolet sensor to fill in sparse IR data. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in active depth sensing, point clouds and image processing in general.

Figure 1:
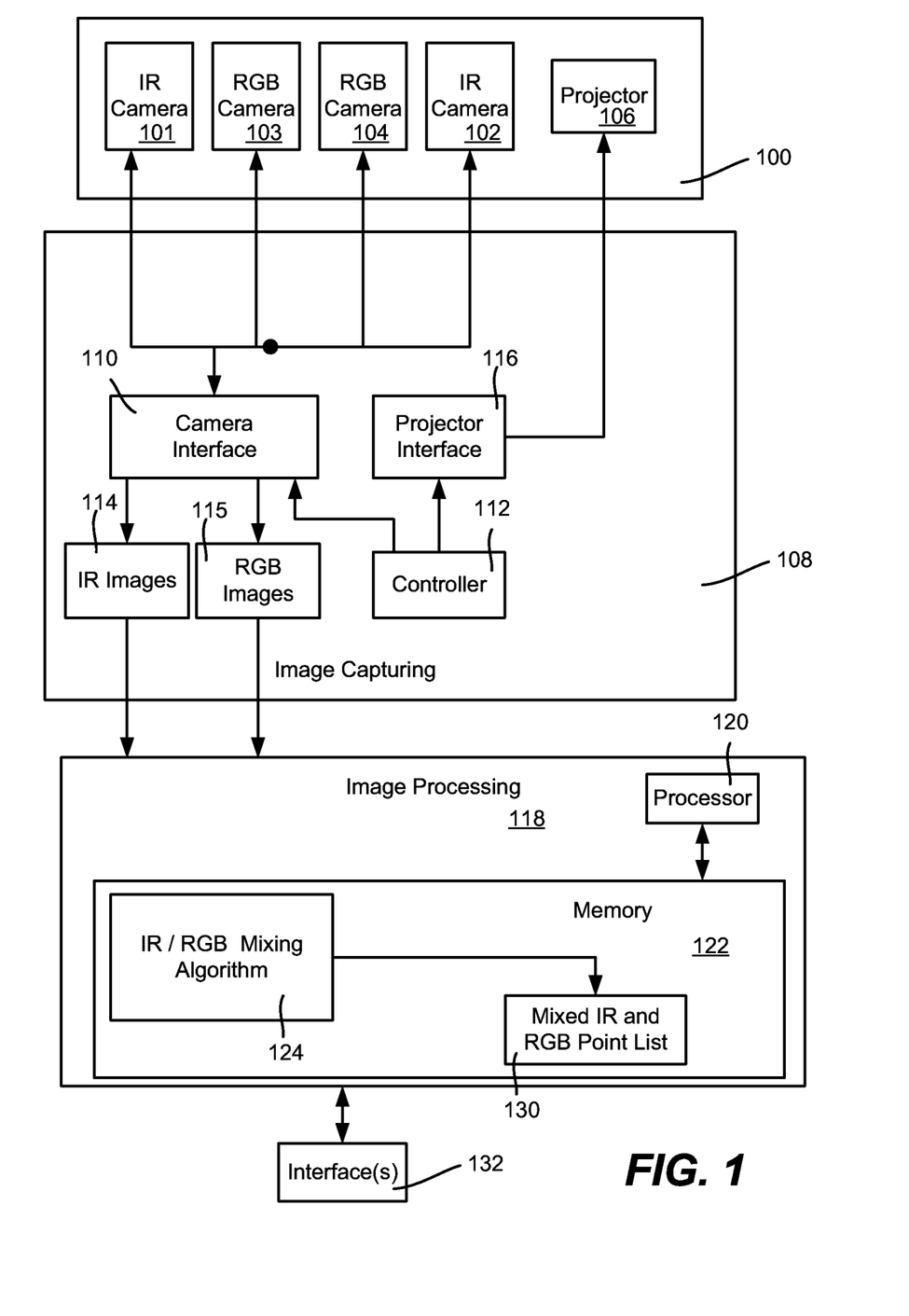
FIG. 1 is a block diagram representing example components that may be used to augment sparse infrared data with RGB data, according to one or more example implementations.

FIG. 1 shows an example system in which a pod 100 comprising stereo IR cameras 101 and 102, stereo RGB cameras 103 and 104, and a projector 106 (e.g., an IR laser diffracted into many thousands of dots) captures stereo IR images and RGB images. Note that the pod 100 is only one example arrangement, and that in other arrangements, the cameras 101-104 may be arranged in any order relative to one another. Indeed, in one implementation the projector is positioned above the cameras. Further, any of the cameras and/or the projector may be separated from one another, rather than being part of any pod configuration; no pod is needed. Thus, FIG. 1 is only showing components for purposes of explanation, and no scale, relative dimensions, relative positions, combinations of devices within a housing/pod device and so on should be inferred from FIG. 1.

In the example of FIG. 1, the pod 100 is coupled to (or combined with) an image capturing system or subsystem 108. The cameras are generally controlled, e.g., via camera interface 110 and controller 111, to capture stereo images synchronized in time (e.g., the cameras are "genlocked"). In one implementation the cameras 101 and 102 capture infrared (IR) images 114, as IR is highly effective in depth estimation in varying light conditions and does not affect the visible appearance of the scene. Further, the cameras 103 and 104 capture stereo RGB images 115. As can be readily appreciated and as exemplified below, in some scenarios such as studio environments, more than one such pod and image capturing system/subsystem may be present.

In FIG. 1, a projector 106 is shown that projects an IR pattern onto a scene, such as a pattern of spots (e.g., dots) or a line pattern, although other spot shapes and/or pattern types may be used. For purposes of brevity, dots are generally described hereinafter. By illuminating the scene with a relatively large number of distributed infrared dots, the IR cameras 102 and 103 capture texture data as part of the infrared image data. Note that the projector 106 is shown as coupled to the controller 112 via a projector interface 116; any such control may be as simple as turning the projector on and off or using energy saving modes, however more complex control such as pulsing, changing dot distribution, changing intensity and/or the like is feasible.

Figure 2:
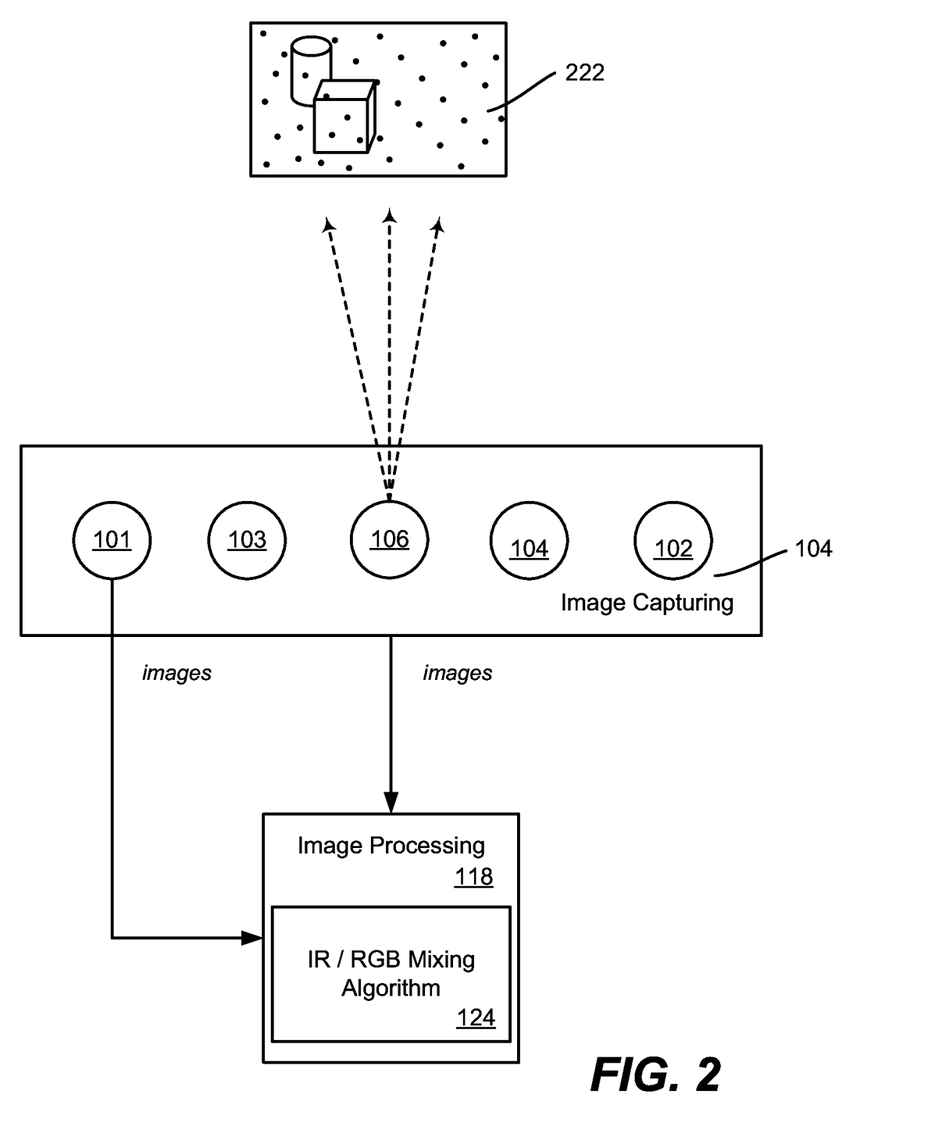
FIG. 2 is a representation of an example of projecting dots into a scene, for obtaining IR data according to one or more example implementations.

FIG. 2 exemplifies this projection concept. The projector 106, represented as a circle in between the stereo cameras 101-104, projects a dot pattern onto a scene 222. The cameras 101-104 capture the dots as they reflect off of object surfaces in the scene 222 and (possibly) the background. In general, disparity in the images two cameras see are indicative of the distance to the reflective surface. Note that FIG. 2 is not intended to be to scale, nor convey any sizes, distance, dot distribution pattern, dot density and so on.

Returning to FIG. 1, the images captured by the cameras 101-104 are provided to an image processing system or subsystem 118. In some implementations, the image processing system 118 and image capturing system or subsystem 104, or parts thereof, may be combined into a single device. For example a home entertainment device may include all of the components shown in FIG. 1 (as well as others not shown). In other implementations, parts (or all) of the image capturing system or subsystem 104, such as the cameras and projector may be a separate device that couples to a gaming console, personal computer, mobile device, dedicated processing device and/or the like.

The image processing system or subsystem 118 includes a processor 120 and a memory 122 containing one or more image processing algorithms, including an IR/RGB mixing algorithm 124 as described herein. In general, the IR/RGB mixing algorithm 124 outputs a list 130 or other suitable data structure that includes IR points and RGB points having associated values from which depth may be determined. Also shown in FIG. 1 is an interface 132 to the image processing system or subsystem 118, such as for connecting a keyboard, game controller, display, pointing device microphone for speech commands and/or the like as appropriate for a user to interact with an application or the like that uses the mixed IR/RGB point list 130.

Figure 3:
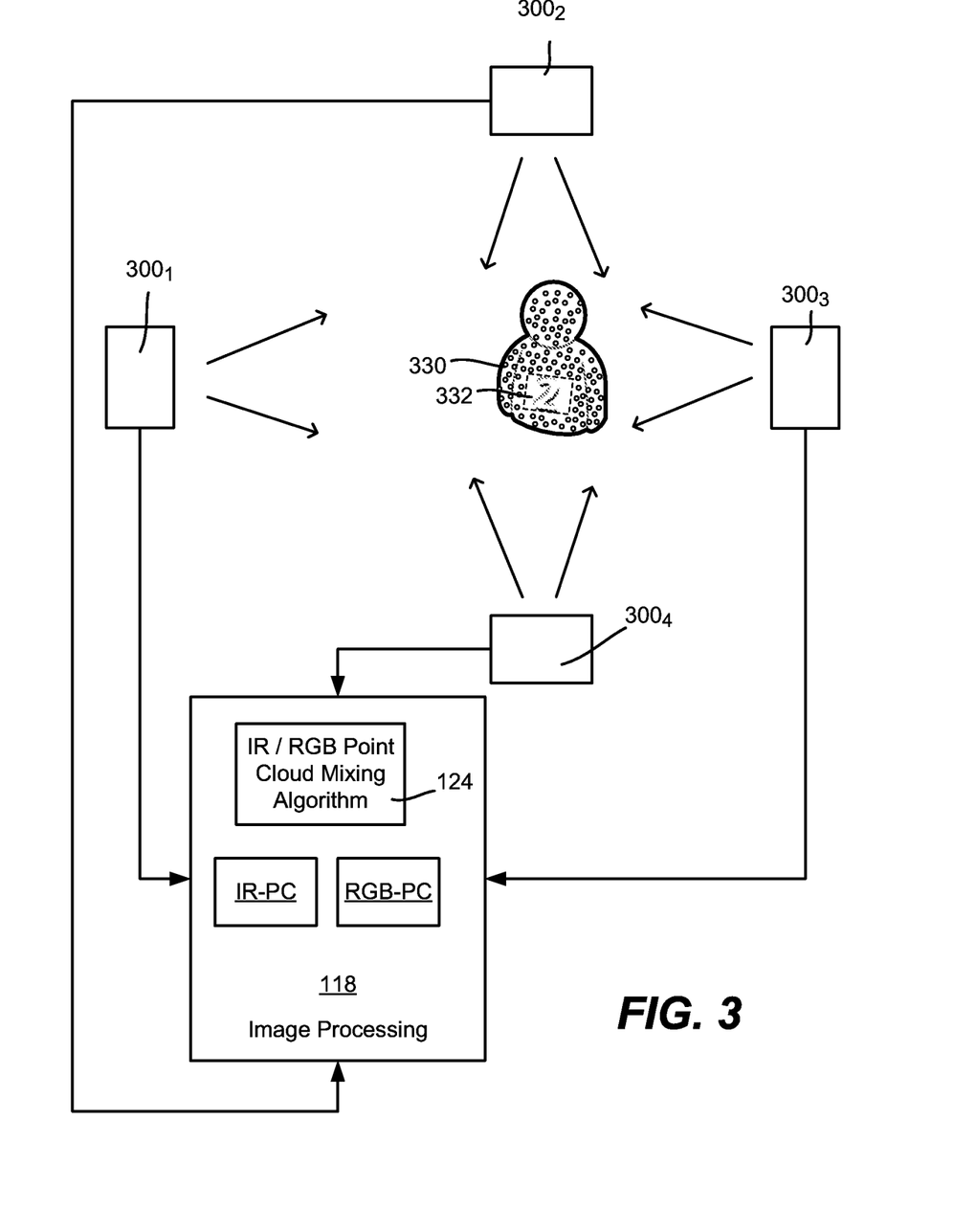
FIG. 3 is a representation of how projected dots may be used in a multiple camera set scenario, according to one or more example implementations.

FIG. 3 shows a plurality of pods $300_1$-$300_4$ arranged to capture images of an object (e.g., a person) from different perspectives. Note that while four such pods are depicted in FIG. 3, it is understood that any practical number may be present in a given configuration. For example, one such configuration uses nine pods, with two sets of four pods at different heights surrounding a space plus one pod above the space.

In the example of FIG. 3, the IR and RGB image data captured from each of the four (or more) pods form separate IR and RGB point clouds, (IR-PC and RGB-PC, respectively). The point cloud data is made available to the IR/RGB point cloud mixing algorithm 124 for processing as described herein.

As generally represented in FIG. 3, the projectors of each pod project the light pattern (IR dots) onto an object, e.g., person 330. The reflected IR light is captured at each pod $300_1$-$300_4$. However, as exemplified in FIG. 3, (and also in enlarged form in FIG. 4), some surfaces (corresponding to the area 332) do not reflect IR light well. Human hair is one example, however many materials, fabrics and the like have poor IR reflective properties. Note that the dots in FIGS. 3 and 4 are for illustrative purposes only, and that the distribution, overall density, sizes and so on are not intended to convey any actual sizes, density and/or distribution information.

Thus, there is sparse IR data at the area 332. As described herein, this level of sparseness is detected where it exists in the image, and RGB points added to regions where IR points are sparse.

This end, given a point cloud, the point cloud data may be projected onto a two-dimensional image plane from any given perspective. Thus, an image plane for each pod may have the point cloud data projected onto it, one image plane for IR data, and the other for RGB data. Alternatively, (e.g., if there is no point cloud), each frame of IR data and RGB data are captured as two-dimensional (2D) images at the cameras, whereby the image plane data exists from the capturing.

Figure 4:
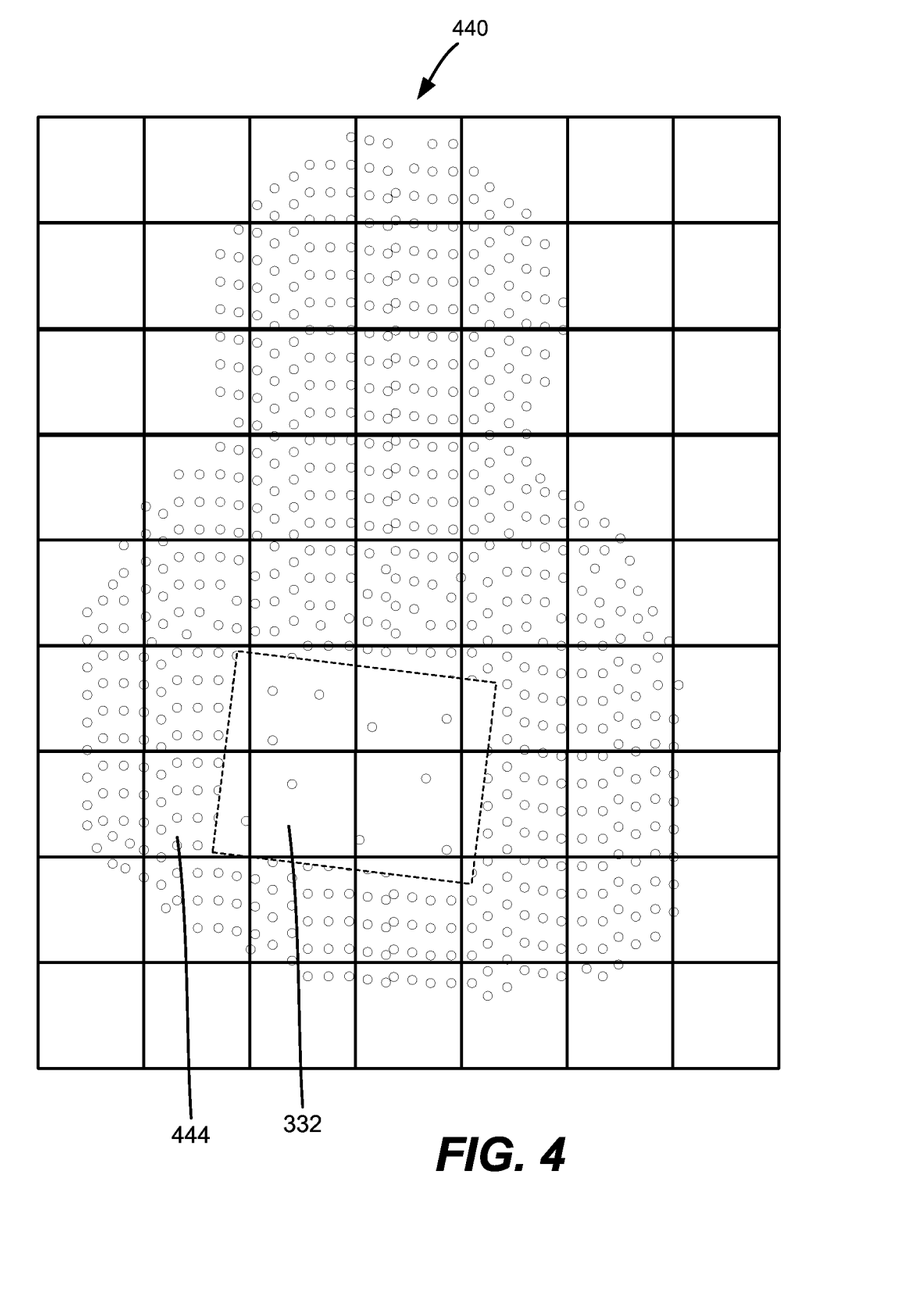
FIG. 4 is a representation of how detected infrared data may be sparse in an area that reflects IR light poorly, according to one or more example implementations.

In any event, FIG. 4 shows how a 2D image 440 may be separated into grid-like subparts for determining the density of reflected IR dots captured therein. As can be seen from this simplified example, the density is low in the area 332 corresponding to the surface that reflected IR light poorly. Note that the size of the grids and the number of grids is not intended to convey any actual size, relative size, relative number and so on.

Virtually any technique to locate sparseness within subsections of an array may be used, and need not be based upon grids, but grids provide a straightforward solution. For example, one straightforward way to detect sparseness uses a counting mechanism that counts points in grid cells. For example, if the number of dots in a given grid cell is below a threshold value, then that particular grid cell is considered sparse. In such a situation, the RGB data for that grid is kept to augment the sparse IR data, for use as desired (e.g., in depth detection).

Figure 5:
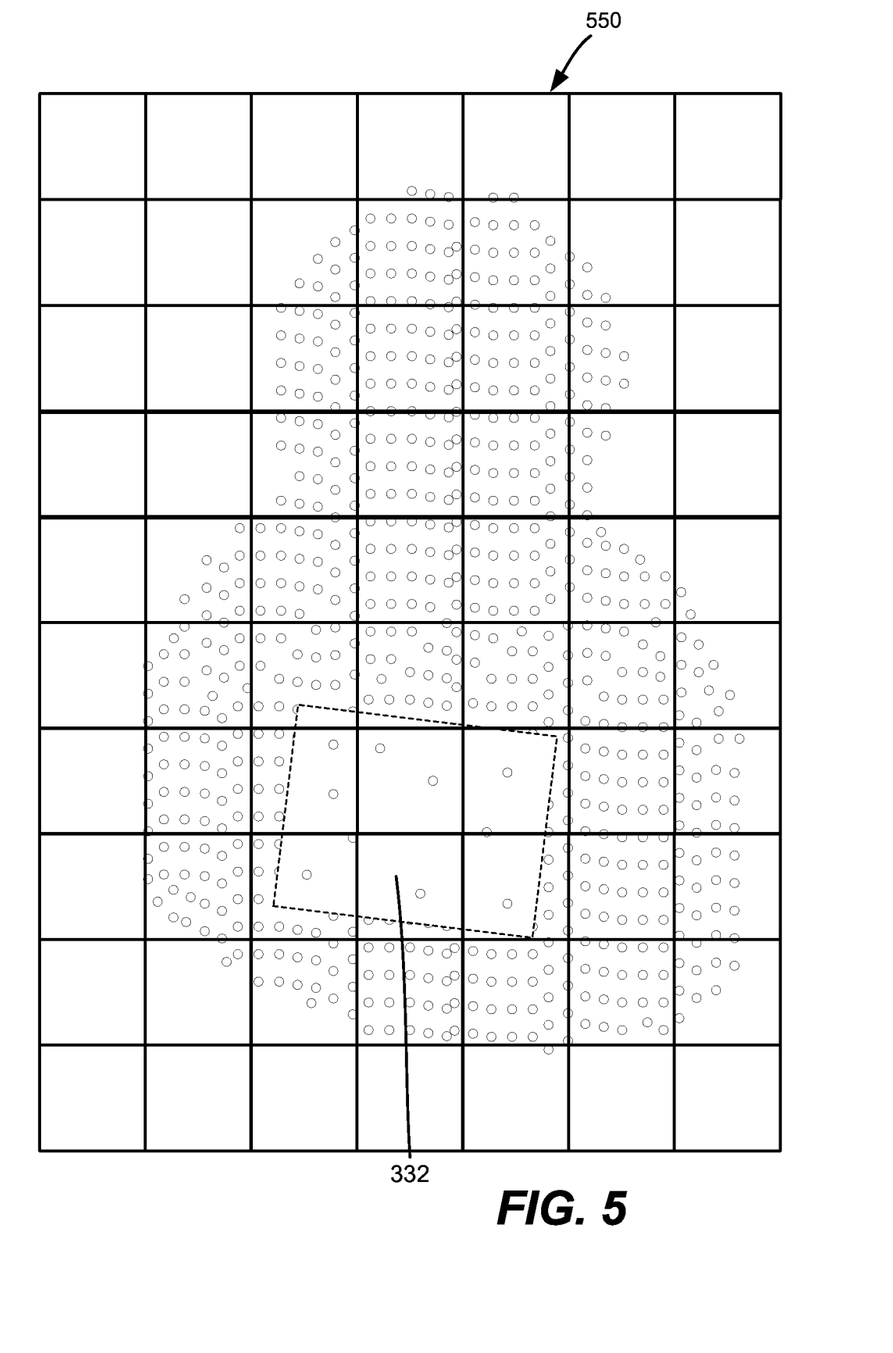
FIG. 5 is a representation of how sparse infrared regions may be determined from IR data, according to one or more example implementations.

FIG. 5 shows essentially the same example as in FIG. 4, except that the grid cells are shifted based upon maximizing sparseness (or conversely maximizing density) or based upon some other criterion. By shifting the grids, (and/or elongating them or shortening them vertically and/or widening or narrowing them horizontally), different subparts are sparse. For example, in FIG. 5, there are six grid cells (regions) near the area 332 that are likely to be determined as sparse, versus four such grid cells in the example of FIG. 4. Note that adding RGB adds some noise to depth sensing, but in many instances having depth data with some noise in a region is an improvement over having no or only very sparse depth data in that region.

Figure 6:
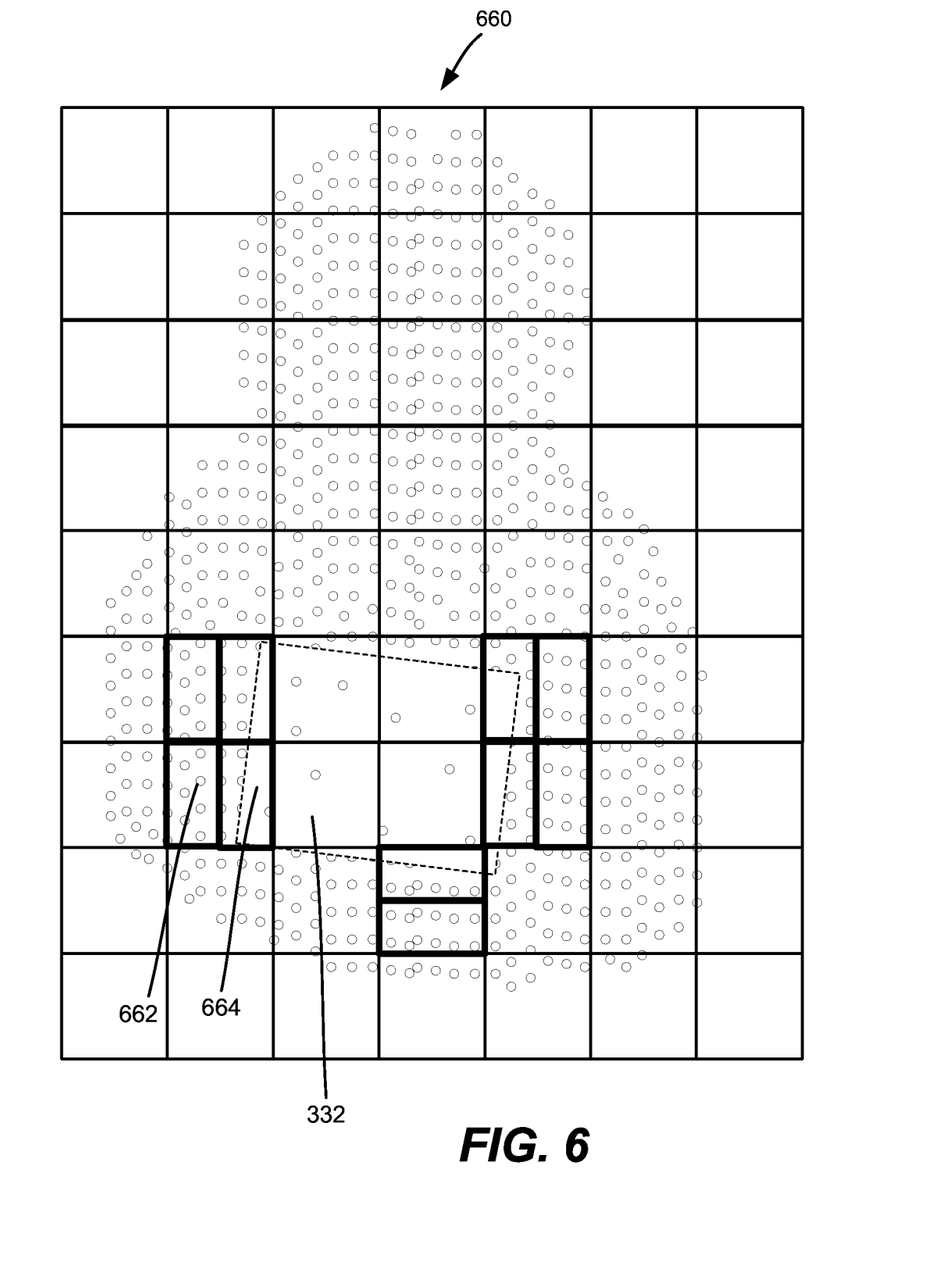
FIG. 6 is a representation of how sparse regions may be varied, according to one or more example implementations.

FIG. 6 shows another alternative, in which grid cells may be arbitrarily sized and/or arranged, such as to increase or decrease the number of RGB points added. For example, what was a single grid cell 444 in FIG. 4 is divided into two smaller grid cells 662 and 664 in FIG. 6. This is also represented by the bolder lines around these cells, as well as other smaller cells in FIG. 6. Note that this may be done during counting, e.g., a non-sparse but "just-above-the-threshold" cell may be subdivided into sub-regions to determine whether one part is now sparse, e.g., relative to a reduced threshold, such as half the threshold if the grid cell's area is divided in half. This tends to increase the RGB data added because sometimes what was a non-sparse cell may be divided into a sparse part and a non-sparse part. Conversely, to reduce amount of RGB data added, sparse but "just-below-the-threshold" cells may be subdivided to determine whether one part is now non-sparse. Both of these alternatives may be done at the same time.

Figure 7:
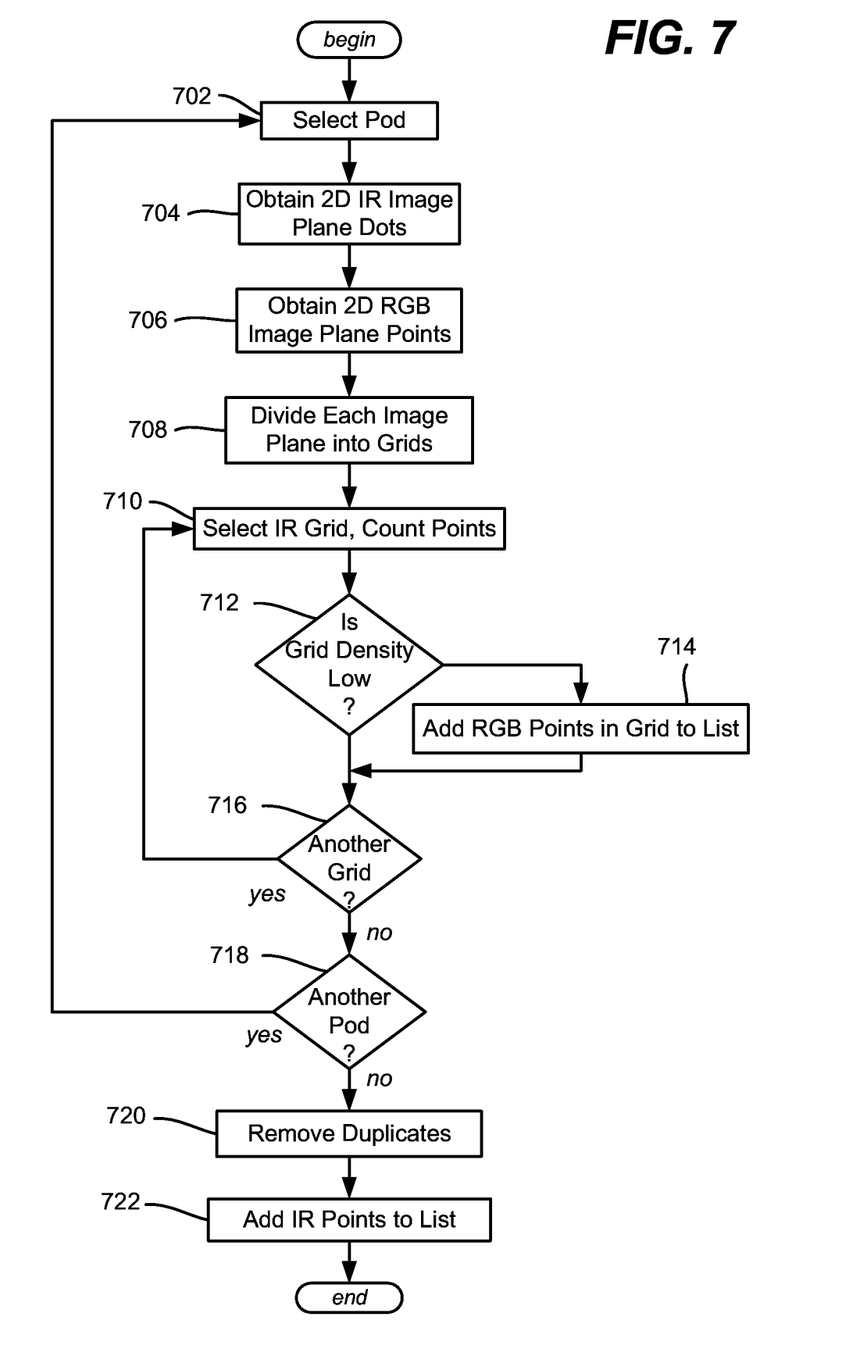
FIG. 7 is a flow diagram representing example steps that may be taken to determine sparse IR regions and add data from counterpart RGB regions to a data structure, such as for use as depth-related data, according to one or more example implementations.

FIG. 7 is a flow diagram representing example steps of a suitable IR-RGB mixing algorithm. In general, the algorithm is repeated per pod (via steps 702 and 718) to obtain a comprehensive list of IR points augmented with RGB points in regions where IR is sparse (as detected relative to any pod).

Step 702 selects a pod, and steps 704 and 706 obtain the 2D IR and RGB image planes for that pod, e.g., via point cloud projection (or as captured at that pod; note that for purposes of determining density, only one of the stereo images may be used). Step 708 divides each image into subparts, e.g., grids. The grids may be of any suitable size (e.g., sixteen-by-sixteen blocks).

Step 710 selects a grid from the IR image plane, and counts the IR points therein. Step 712 determines whether the grid density is low, e.g., by evaluating the count against a threshold. The threshold may be a fixed number (e.g., ten) that is reasonable, estimated or computed for a given configuration of pods, projection pattern density, and distances to the illuminated object, or may be varied based upon statistical techniques/analysis such as averaging and standard deviation. The grid size and/or shapes (e.g., squares, rectangles, triangles, hexagons) and so forth likewise may be varied.

In any event, when a sparse grid cell or the like is detected at step 712, step 714 adds the RGB points from the counterpart grid cell in the RGB image plane data to a list or other suitable data structure. If not sparse, then sufficient IR data is present in that region for use as desired.

Step 716 repeats the process for the next grid, and so on, until all grids have been processed. Step 718 repeats the process for the other pods until all pods have been processed.

When the pods have been processed, the RGB image data is in the list or the like. There may be duplicates in the list, which may be removed via step 720; (note that alternatively, duplicates may not be added at step 714). Step 722 adds the IR points (from all pods) to the list, and the process ends. The list now contains all of the IR points, plus RGB points where the IR data was sparse for any pod.

Note that in alternative implementations, the amount of sparseness may be a factor in adding the RGB. For example, the closer the IR count is to the threshold, then the less the number of RGB points that may be added. Similarly, the closeness of an RGB point to an IR point in coordinate space may determine whether to add that point.

As can be seen, described is a technology by which an image or point cloud with sparse IR data regions may be mixed with RGB data at the sparse regions. The resulting mixed data may be used to obtain depth values where no or only sparse IR data regions exist.

Example Operating Environment

Figure 8:
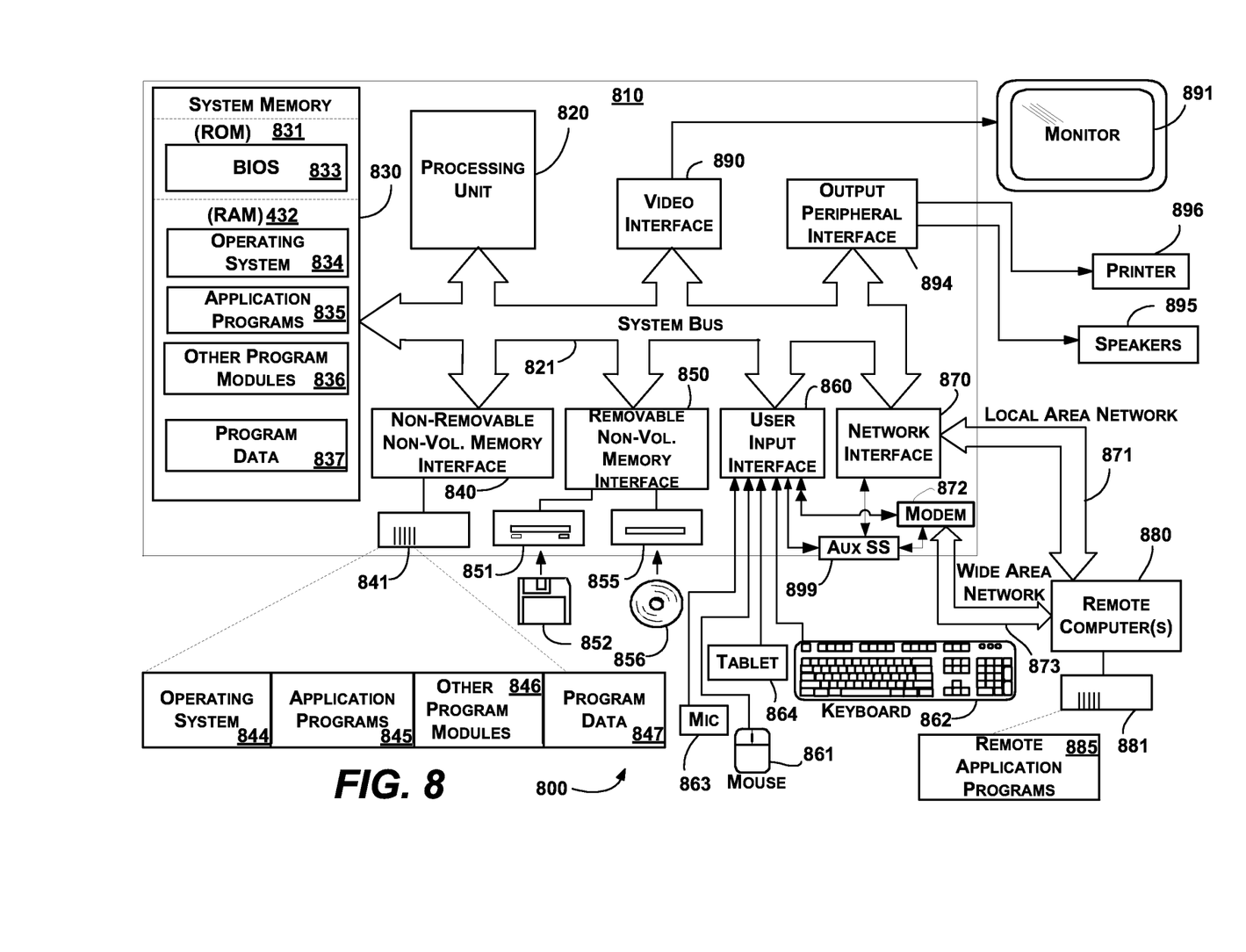
FIG. 8 is a block diagram representing an exemplary non-limiting computing system or operating environment into which one or more aspects of various embodiments described herein can be implemented.

FIG. 8 illustrates an example of a suitable computing and networking environment 800 into which computer-related examples and implementations described herein may be implemented, for example. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the example operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an example system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device.

By way of example, and not limitation, FIG. 8 illustrates remote application programs 885 as residing on memory device 881. It may be appreciated that the network connections shown are examples and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System on chip systems (SOCs), Complex Programmable Logic Devices (CPLDs), etc.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method, comprising, obtaining infrared data corresponding to an infrared image plane having infrared data points, obtaining color component data corresponding to the image plane having color component data points, determining a region in the infrared image data that is a sparse region with respect to having infrared data points therein, and adding at least some color component data corresponding to color component data points from a counterpart region in the color component image data to a data structure.

2. The method of claim 1 wherein obtaining the infrared image plane comprises projecting infrared data from a point cloud.

3. The method of claim 1 wherein determining a region in the infrared image plane that is a sparse region comprises evaluating a number of infrared points versus a threshold value.

4. The method of claim 3 further comprising, determining the threshold based upon statistical analysis of captured infrared data.

5. The method of claim 1 further comprising, dividing the image plane into a plurality of regions, including one region that comprises the sparse region.

6. The method of claim 5 further comprising, subdividing at least one region into sub-regions.

7. The method of claim 5 wherein dividing the image plane into the plurality of regions comprises dividing the image plane into grid-like cells.

8. The method of claim 7 further comprising, shifting the grid-like cells relative to data in the image plane or resizing one or more of the grid-like cells, or both, based upon density data.

9. The method of claim 1 wherein adding the at least some color component data comprises adding an amount of color component data based upon a level of sparseness of the region.

10. The method of claim 1 further comprising, dividing the image plane into a plurality of regions, including one region that comprises the sparse region, in which a size of at least some of the regions is determined based upon density data.

11. The method of claim 1 further comprising, removing duplicate data from the data structure.

12. The method of claim 1 further comprising, removing duplicate data from the data structure.

13. The method of claim 1 further comprising, adding infrared data to the data structure.

14. The method of claim 1 further comprising, using the data structure to provide depth data for a point cloud.

15. A system comprising, an image processing component, the image processing component configured to receive infrared images captured by at least one infrared (IR) camera, and counterpart red, green, blue (RGB) images captured by at least one RGB camera, and a mixing component coupled to or incorporated into the image processing component, the mixing component configured to process infrared data corresponding to an infrared image to determine a sparse region therein, and for the sparse region, to add RGB data corresponding to a counterpart region in a counterpart RGB image to a data structure.

16. The system of claim 1 wherein the image processing component is configured to receive the infrared image data corresponding to infrared point cloud data and the RGB data corresponding to RGB point cloud data that is based upon images from a plurality of sets of stereo cameras.

17. The system of claim 16 wherein the mixing component is configured to add RGB data from at least two different sets of RGB data obtained from two different sets of stereo cameras.

18. The system of claim 16 wherein at least one of the sets of stereo cameras is configured as a pod comprising a plurality of RGB cameras and a plurality of infrared cameras.

19. One or more computer-readable storage media or logic having computer-executable instructions, which on execution perform operations, comprising:
obtaining first infrared (IR) data corresponding to point cloud data projected onto a first image plane;
obtaining first red, green, blue (RGB) data corresponding to point cloud data projected onto the first image plane;
determining one or more first sparse infrared regions in the first infrared data;
determining one or more first counterpart regions of the first sparse infrared regions in the first RGB data;
adding at least some RGB data from the one or more first counterpart regions to a data structure;
obtaining second infrared (IR) data corresponding to point cloud data projected onto a second image plane;
obtaining second red, green, blue (RGB) data corresponding to point cloud data projected onto the second image plane;
determining one or more second sparse infrared regions in the second infrared data;
determining one or more second counterpart regions of the second sparse infrared regions in the second RGB data;
adding at least some RGB data from the one or more second counterpart regions to the data structure.

20. The one or more computer-readable storage media or logic of claim 19 having computer-executable instructions comprising, using infrared data and RGB data in the data structure to determine depth data.

* * * * *